UNITED STATES PATENT OFFICE.

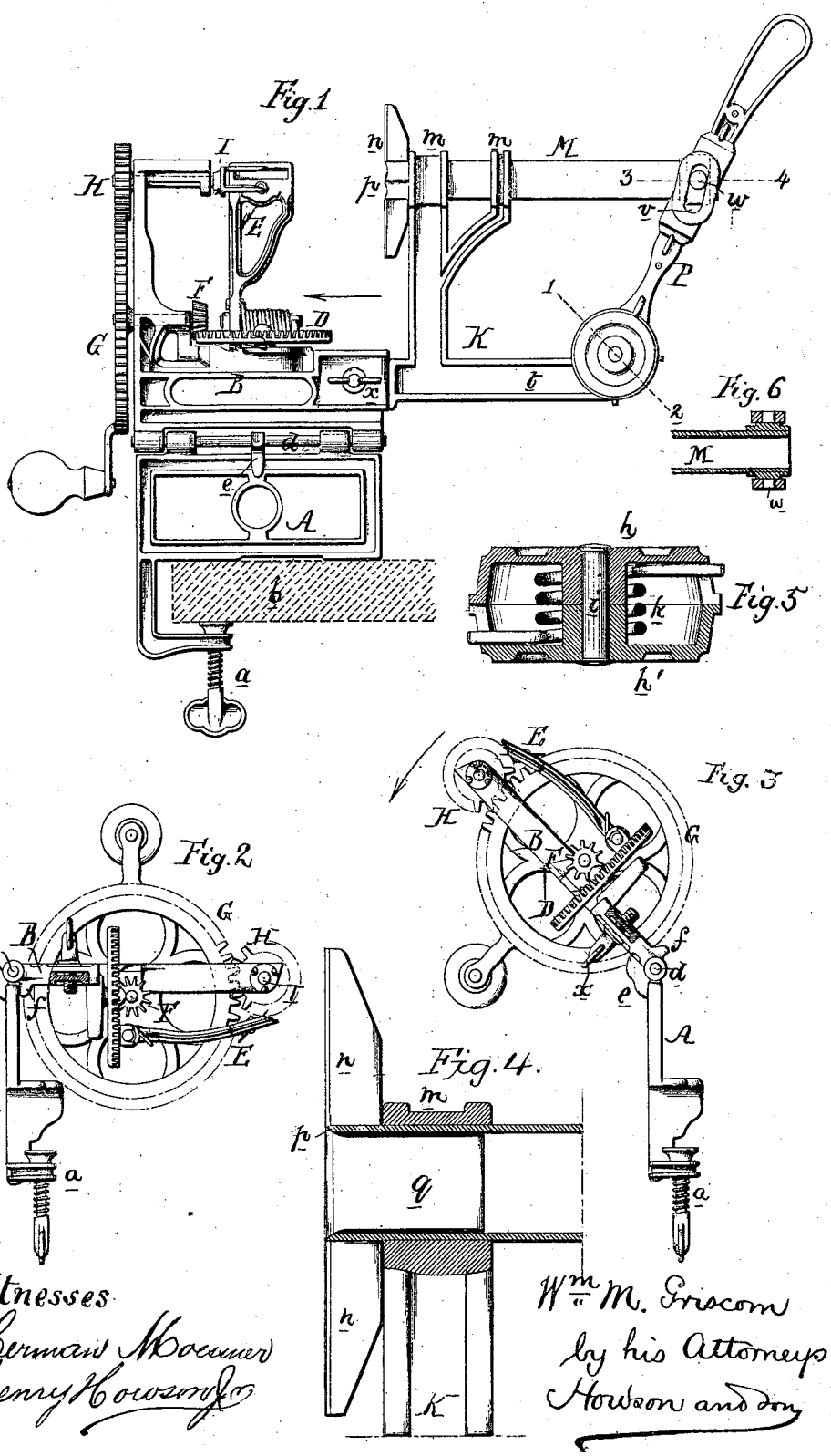

WILLIAM M. GRISCOM, OF READING, PENNSYLVANIA.

IMPROVEMENT IN COMBINED APPLE PARER, CORER, AND SLICER.

Specification forming part of Letters Patent No. 184,371, dated November 14, 1876; application filed August 26, 1876.

*To all whom it may concern:*

Be it known that I, WILLIAM M. GRISCOM, of Reading, Pennsylvania, have invented an Improvement in Apple Paring, Slicing, and Coring Machines, of which the following is a specification:

The main objects of my invention are to so hinge the frame of an apple-paring machine to a clamped frame that the parings may be made to fall in one place and the pared apple in another, and to facilitate the paring, coring, and slicing of apples by combining an apple-parer with a coring and slicing device, as described hereafter.

In the accompanying drawing, Figure 1 is a side view of my improved apple-paring machine with slicing and coring device; Figs. 2 and 3, end views of the paring device, looking in the direction of the arrow, Fig. 1, and showing the said device in different positions; Fig. 4, a sectional view, drawn to an enlarged scale, of part of the coring and slicing device; Fig. 5, a section, drawn to an enlarged scale, on the line 1 2, Fig. 1; and Fig. 6, a section on the line 3 4.

A is a frame, provided with a clamping-screw, $a$, or other clamping device, by which the said frame may be secured to a table, $b$; and B is the frame which carries the paring device, and which is hinged by a rod, $d$, to the frame A. The frame B can be moved on its hinge to either of the positions shown in Figs. 2 and 3, a lug, $e$, bearing against the fixed frame A, serving to restrict the movement of the frame B in the direction of the arrow 2, Fig. 3, and lugs $f$ on the said frame B preventing its movement in a contrary direction farther than is shown in Fig. 2. The parer itself is, with the exception of the lower portion of the frame, similar to those of the usual construction. It has the bevel-wheel D, carrying the ordinary paring-arm E, and driven by a pinion, F, on a shaft, provided with a handled cog - wheel, G, gearing into a wheel, H, on a spindle, I, which has the pronged end for receiving the apple, all these parts operating in the same manner as those of ordinary apple-parers.

The advantage of thus combining an ordinary apple - parer with a frame composed of two parts hinged together is this: The apple may be pared while the machine is in the position shown in Fig. 2, so that the parings may fall to the ground, or into any suitable receptacle on the same, after which the hinged frame can be moved to the position shown in Fig. 3, when the pared apple may be discharged onto a receptacle on the table.

The coring device is carried by a frame, K, which I prefer to so adapt to the hinged frame B that it can be readily attached to and detached therefrom, so that the separate parts can be packed in a comparatively small compass for transportation. A tube, M, is arranged to slide in bearings $m\ m$ on the frame K, and the inner end of this tube is sharpened at $p$ by beveling from the inside, as best observed in Fig. 4, and at this end of the tube are the radial slicing-knives $n$. The interior of this end of the tube is contracted at $q$, in the present instance by a short tube or ferrule secured to the said interior of the tube M. A lever, P, is hinged to the projecting lower portion $t$ of the frame K, and has an opening for receiving the outer end of the tube, as best observed in Fig. 6, pins or trunnions $w$, projecting from opposite sides of the tube, passing through slots $v$ in the lever.

The manner of hinging the lever P to the frame K will be best understood by reference to the enlarged view, Fig. 5, in which $h$ and $h'$ are two flanged disks, the former being a part of the projection $t$ of the frame K, and the latter a part of the lever P, the two being so connected together by a pin, $i$, that the disk $h'$ can turn freely independently of the disk $h$.

In the space between the two disks, and surrounding the central hubs of the same, is a spiral spring, $k$, composed of a piece of wire, one end of which passes through the flange of the disk $h$, the other through the flange of the disk $h'$. The tendency of this spring is to maintain the lever P in the position shown in Fig. 1.

It should be understood that the tube M is in line with the forked spindle I of the apple-parer, so that when an apple has been pared, and is still on the forked end of the spindle, the tube M is forced forward by manipulating the lever P, and the sharpened end of the tube will make an annular cut through the center of the apple, while the latter is sliced by the knives $n$, after which the handle P is released, and, owing to the spring $k$, both tube and handle move back to their original position. (Shown in Fig. 1.)

The object of contracting the tube internally at $q$ is, that it may embrace and retain the core which is forced into it, and which might otherwise be left behind on the rearward movement of the tube M. When a second apple is operated on, the core thus retained in the contracted portion of the tube will be thrust by the second core back into the portion of the tube which is enlarged internally, and core after core will be discharged at the rear of the tube, and fall into any suitable receptacle at a distance from that which receives the slices of the pared apple.

In the drawing I have combined the coring and slicing mechanism with the hinged frame B, so that the parings may be deposited in one place, the slices in another, while the cores fall in a third and different locality.

It should be understood that the coring and slicing device may be combined with the fixed frame A, or with the fixed frame of any ordinary apple-parer; but it is preferable in all cases that the two should be readily detachable from each other. In the present instance a projection on the frame K of the corer and slicer fits snugly in a pocket in the frame of the parer, and is confined thereto by a thumb-screw, $x$, on withdrawing which the two parts may be detached from each other.

I claim as my invention—

1. The combination of the frame A, having a clamping device, with the apple-parer frame B, hinged to the said frame A, and restricted in its movement by stops or otherwise, all substantially as and for the purpose set forth.

2. The combination of a frame, A, having a clamping device, with an apple-paring and a coring and slicing device, carried by a frame hinged to the said frame A, all substantially as specified.

3. The combination of the coring-tube M with the ferrule, adapted to the interior of the said tube at $q$, as and for the purpose set forth.

4. The combination of the coring-tube M and lever P, having a flanged disk, $h'$, with a flanged disk, $h$, on the frame, and with the spring $k$, contained between the two disks, all substantially as specified.

In testimony whereof I have signed my name to this specification in the presence of two subscribing witnesses.

WILLIAM M. GRISCOM.

Witnesses:
 HUBERT HOWSON,
 HENRY HOWSON, Jr.